(12) United States Patent
Laluet et al.

(10) Patent No.: US 9,891,510 B2
(45) Date of Patent: Feb. 13, 2018

(54) METHOD FOR IMPLEMENTING A DEVICE FOR DISPLAYING A REAL IMAGE

(71) Applicant: SEKISUI CHEMICAL CO., LTD., Osaka, Osaka (JP)

(72) Inventors: Jean-Yves Laluet, Paris (FR); Guillaume Lecamp, Paris (FR)

(73) Assignee: SEKISUI CHEMICAL CO., LTD., Osaka (JP)

( * ) Notice: Subject to any disclaimer, the term of this patent is extended or adjusted under 35 U.S.C. 154(b) by 265 days.

(21) Appl. No.: 14/439,964

(22) PCT Filed: Oct. 28, 2013

(86) PCT No.: PCT/FR2013/052565
§ 371 (c)(1),
(2) Date: Apr. 30, 2015

(87) PCT Pub. No.: WO2014/068227
PCT Pub. Date: May 8, 2014

(65) Prior Publication Data
US 2015/0316838 A1    Nov. 5, 2015

(30) Foreign Application Priority Data

Oct. 31, 2012    (FR) ...................... 12 60409

(51) Int. Cl.
*G03B 21/20* (2006.01)
*H04N 9/31* (2006.01)
(Continued)

(52) U.S. Cl.
CPC ...... *G03B 21/204* (2013.01); *B32B 17/10036* (2013.01); *B32B 17/10339* (2013.01);
(Continued)

(58) Field of Classification Search
CPC ........ G02B 27/0101; G02B 2027/0194; B32B 17/10761
(Continued)

(56) References Cited

U.S. PATENT DOCUMENTS 6,979,499 B2    12/2005    Walck et al.
2002/0120916 A1    8/2002    Snider, Jr.
(Continued)

FOREIGN PATENT DOCUMENTS

EP    2 466 361 A1    6/2012
TW    201239394 A1    10/2012
WO    2010/139889 A1    12/2010

OTHER PUBLICATIONS

International Search Report dated Mar. 5, 2014 in PCT/FR13/052565 Filed Oct. 28, 2013.
(Continued)

*Primary Examiner* — Steven H Whitesell Gordon
*Assistant Examiner* — Jerry Brooks
(74) *Attorney, Agent, or Firm* — Cheng Law Group, PLLC

(57) ABSTRACT

Method of using a device for displaying a real image of the head-up display (HUD) type in a passenger compartment comprising glazing, notably laminated glazing, said device comprising a source emitting a beam of radiation of the visible UV or IR laser type or of the light-emitting diode type, directed towards a portion of said glazing comprising a fluorescent material absorbing said radiation and re-emitting light in the visible region, the illumination of said portion by the beam enabling a real image to be displayed on the glazing.

12 Claims, 2 Drawing Sheets

(51) Int. Cl.
   *G02B 5/30*      (2006.01)
   *G02B 27/01*     (2006.01)
   *B32B 17/10*     (2006.01)
   *G03B 21/60*     (2014.01)

(52) U.S. Cl.
   CPC .. *B32B 17/10669* (2013.01); *B32B 17/10761* (2013.01); *G02B 5/30* (2013.01); *G02B 27/0101* (2013.01); *G03B 21/2073* (2013.01); *G03B 21/60* (2013.01); *H04N 9/3102* (2013.01); *H04N 9/3129* (2013.01); *H04N 9/3161* (2013.01); *H04N 9/3167* (2013.01); *G02B 2027/012* (2013.01); *G02B 2027/0161* (2013.01)

(58) Field of Classification Search
   USPC ................................. 353/7; 345/633, 173
   See application file for complete search history.

(56) References Cited

U.S. PATENT DOCUMENTS

| | | |
|---|---|---|
| 2005/0174635 A1 | 8/2005 | Bruegl et al. |
| 2006/0066508 A1 | 3/2006 | Walck et al. |
| 2008/0018641 A1 | 1/2008 | Sprague et al. |
| 2010/0214194 A1 | 8/2010 | Kanou |
| 2010/0254019 A1 | 10/2010 | Cui et al. |
| 2012/0068083 A1 | 3/2012 | Labrot et al. |
| 2012/0243104 A1 | 9/2012 | Chen et al. |

OTHER PUBLICATIONS

Taiwanese Office Action for the Application No. 102139078 dated Feb. 21, 2017.

METHOD FOR IMPLEMENTING A DEVICE FOR DISPLAYING A REAL IMAGE

The present invention relates to the field of display systems projected on transparent screens, particularly windscreens of vehicles or the glazing of buildings.

The invention relates more specifically, but not exclusively, to the field of image display systems such as those known in the art as head-up display or HUD systems. These image display systems are used, notably, in aircraft cockpits, in trains, and now also in private motor vehicles (such as cars, goods vehicles and the like). The invention relates, in particular, to devices for display on glass, characterized by the formation of a real image using a laser projector.

In these systems, the glazing is generally composed of a sandwich structure, in the simplest case comprising two sheets of strong material such as glass sheets. The sheets of strong material are joined together by an interposed thermoformable interlayer, usually comprising or consisting of polyvinyl butyral (PVB).

These head-up display systems, which enable projected information to be displayed on glazing and reflected towards the driver or observer, are already known. These systems can be used, notably, to provide the driver of a vehicle with information without requiring him to look in a different direction from the field of vision extending forwards from the vehicle, thereby greatly increasing safety.

In the earliest method, an image of this type is obtained by projecting information onto a windscreen having a laminated structure, in other words one formed by two sheets of glass and an interlayer of plastic material. The driver sees a virtual image located at a certain distance behind the windscreen. However, the driver then observes a double image, composed of a first image reflected by the surface of the windscreen facing the inside of the passenger compartment, and a second image reflected from the outer surface of the windscreen, these two images being slightly offset from each other. This offset can interfere with the viewing of the information. In order to overcome this problem, the solution proposed in U.S. Pat. No. 5,013,134, may be considered. This patent describes a head-up display system using a laminated windscreen formed by two glass sheets and a polyvinyl butyral (PVB) interlayer, in which the two outer surfaces are not parallel but wedge-shaped, in such a way that the image projected by a display source and reflected by the surface of the windscreen facing towards the passenger compartment is practically superimposed on the same image from the same source reflected by the outwardly facing surface of the windscreen. Conventionally, the double image is eliminated by forming wedge-shaped laminated glazing, using an interlayer whose thickness decreases from the upper to the lower edge of the glazing. However, the profile of the PVB must be very regular, with no variations in thickness, because these variations are transferred to the windscreen during assembly and lead to local variations of angle. In a method of this type, therefore, the aim is to maximize the light reflection at the surface of the glass in order to obtain the maximum intensity of the signal projected on the surface of the glazing.

Alternatively, U.S. Pat. No. 6,979,499 B2 proposes directing an incident beam, having an appropriate wavelength, onto fluorescent materials directly incorporated into the glazing, which can respond to the excitation by emitting light radiation in the visible light region. Thus a real image, rather than a virtual image, is formed directly on the windscreen. This image can also be viewed by all the passengers in the vehicle. U.S. Pat. No. 6,979,499 B2 describes, in particular, a laminated glazing with an interlayer of the polyvinyl butyral (PVB) type, whose two outer surfaces are parallel, and in which an additional layer of fluorescent materials is incorporated. The fluorescent materials are chosen according to the wavelength of the incident exciting radiation. This wavelength can be in the ultraviolet or IR region. Under this incident radiation, the fluorescent materials re-emit radiation in the visible region. In this case, the term "down conversion" is used when the incident radiation is UV, and "up conversion" when the incident radiation is IR. According to this document, this type of construction enables the image of any object to be restored directly on the windscreen. According to this disclosure, fluorescent materials are deposited on the whole of a main surface of one of the sheets forming the laminated glazing (which can be PVB or glass) in the form of a continuous layer comprising a plurality of types of fluorescent materials. The desired image is obtained by the selective excitation of a specified area of the layer of fluorescent material. The location and shape of the image are determined by means of a controlled excitation source modulated by external means.

The applicant's experience has shown that HUD devices of this type, incorporating fluorescent materials in the assembled glazing, are characterized by having excessively weak luminance when exposed to a conventional UV or IR excitation source. In order to obtain sufficient luminance, and therefore sufficient visibility, of the signal projected on the windscreen, notably in conditions of high insolation, it is necessary to use non-conventional light sources, in other words those generating concentrated beams of rays of the laser or light-emitting diode type.

It is possible, notably, to use excitation sources generating a concentrated and guided UV light, delivered by more specific sources of the laser diode type. For the purposes of the present description, the term "concentrated" signifies that the power flux density, at the glazing, of the beam emerging from the generating source is greater than 120 $mW \times cm^{-2}$ and preferably in the range from 200 $mW \times cm^{-2}$ to 20 000 $mW \times cm^{-2}$, or possibly from 500 $mW \times cm^{-2}$ to 10 000 $mW \times cm^{-2}$.

The application WO2010/139889 describes the use of a fluorescent material of the hydroxy-terephthalate type which has a high luminance due to its high quantum efficiency under incident UV excitation and high durability in ageing tests under UV laser excitation.

However, the use of these sources can only be considered if the power levels are restricted, in order to avoid problems due to the dangerous effects of the beam which may be present outside the vehicle in the first place. In particular, if a wavelength of about 400 nm is used, most of the laser radiation can be prevented from passing to the outside, because at these wavelengths the PVB strongly absorbs UV radiation.

However, the power of the incident laser light radiation can also be very dangerous for the passengers present in the compartment, particularly for the driver of the vehicle, owing to the reflection occurring on the glass surfaces of the glazing forming the windscreen. This reflection can create a risk of eye injury and burning for the occupants of the vehicle. The reflection is, in a first approximation, relatively high (at several percent) if the curvature and inclination of a windscreen, for example, are also taken into account.

This danger increases if the light source is required to emit a high-power initial radiation so that the driver can see the information with sufficient contrast for very fast reading.

The present invention relates to a method for ensuring passenger safety by substantially limiting the reflection of the incident radiation from the glass surface.

In particular, the applicant company has found that the system can be made safe in this way by adjusting a set of parameters including, at least, the nature of the incident beam and particularly its polarization, the angular width of the incident beam, the radius of curvature of the windscreen and its inclination in the area illuminated by the beam.

By allowing for these parameters according to the method of the present invention, it is possible, in particular, to determine the optimal positioning of the source in the passenger compartment and in relation to the area of the windscreen in which the information is to be displayed, in order to resolve the aforementioned safety problems in an effective way.

More specifically, the present invention relates to a method of using a head-up display (HUD) device in a passenger compartment comprising glazing, notably laminated glazing, said device comprising a source emitting a beam of radiation of the visible UV or IR laser type or of the light-emitting diode type, directed towards a portion of said glazing comprising a fluorescent material absorbing said radiation and re-emitting light in the visible region, the illumination of said portion by the beam enabling a real image to be displayed on the glazing, said method being characterized in that it comprises the following steps:

the set of positions $i_{[1;n]}$ where the source can be located in the passenger compartment is identified, from a first position $i_1$ of the source in the passenger compartment, a polarized incident beam is emitted in such a way that its electromagnetic field is transverse magnetic, for the whole portion of the glazing illuminated by the beam, the variations of the angle of incidence $\theta_1$ are measured, and a value of the angle $\theta_{1(Rmax)}$ is determined for which the reflection $R_{1max}$ of the incident radiation by the glazing is maximal in said illuminated area and for the source location $i_1$, from a second location $i_2$ of the source whose radiation is directed to illuminate substantially the same portion of said glazing, the same procedure as that of the two preceding steps is followed, so as to determine a value $\theta_{2(Rmax)}$ for which the reflection $R_{2max}$ of the incident radiation by the glazing is maximal in said illuminated area and for the source location $i_2$, the same procedure is followed for all the possible source locations $i_n$, the source is finally located in the position i for which the value of $R_{imax}$ determined in this way is minimal.

According to certain advantageous embodiments of the present method, which can evidently be combined with each other if necessary, The source generates a visible UV laser radiation in the range from 380 to 410 nm, or preferably equal to 405 nm.

The source is a device generating UV laser radiation over an angular half-width $\gamma_{1/2}$ in the range from 5° to 25°, or preferably from 10° to 20°, serving to illuminate the portion of the glazing used for the display of the image.

The device is chosen from the group composed of: projectors based on a MEMS micro-mirror with a laser source, projectors based on DLP, LCD or LCoS matrices with a laser or LED source, and projectors based on galvanometer-mounted mirrors reflecting a laser source.

Said glazing is laminated glazing such as a vehicle windscreen or glazing for a building, comprising an assembly of at least two transparent sheets of inorganic glass or strong organic material, joined together by an interlayer of a thermoformable material or by multilayer sheets incorporating an interlayer of this type, said glazing being characterized in that a fluorescent material is integrated into said interlayer, permitting said display.

The thermoformable material forming said interlayer is chosen from the group composed of PVBs, plasticized PVCs, polyurethane (PU) and ethylene vinyl acetates (EVA).

Said fluorescent material is a hydroxyalkyl terephthalate R—OOC-Φ(OH)$_x$—COOR, having the structural formula:

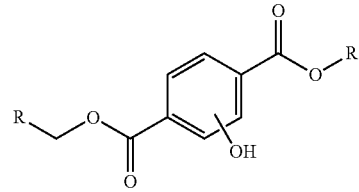

in which Φ denotes a benzene ring substituted by at least one hydroxy group (OH), R is a hydrocarbonated chain comprising 1 to 10 atoms and x is equal to 1 or 2, in particular diethyl-2,5-dihydroxyterephthalate.

The present invention also relates to a passenger compartment of a motor vehicle comprising a head-up display (HUD) device and glazing, notably laminated glazing, said device comprising a source emitting a beam of a concentrated directional radiation of the laser type directed towards a portion of said glazing comprising a fluorescent material absorbing said radiation and re-emitting light in the visible region, the illumination of said portion by the beam permitting the display of a real image on said glazing, in which said source is positioned in the passenger compartment by the method as previously described.

Figure 1:
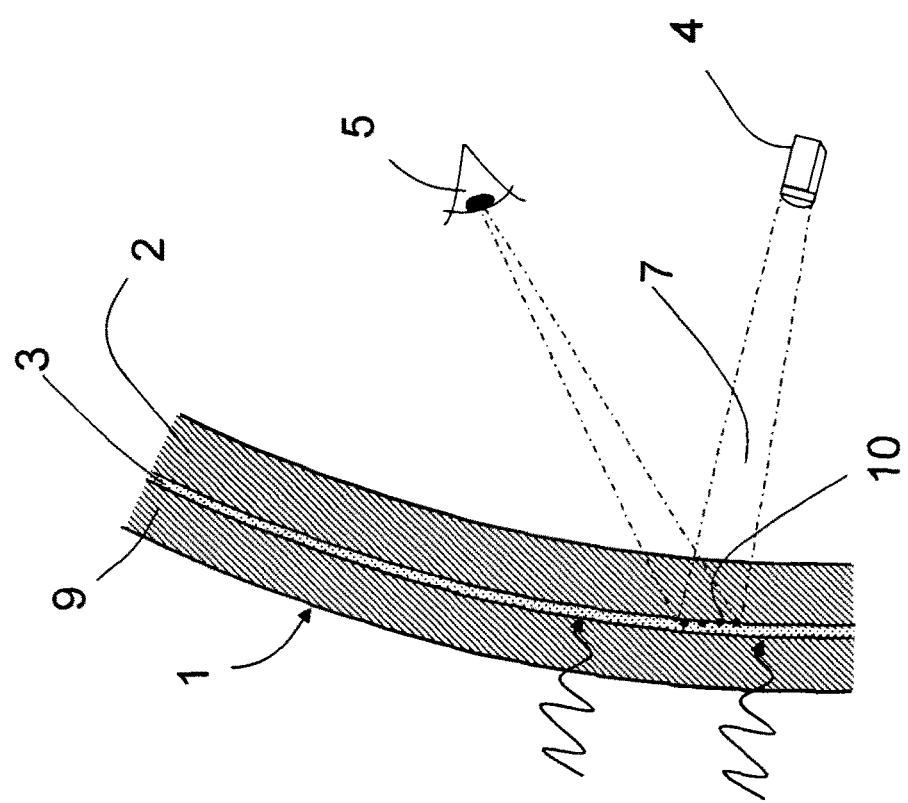
FIG. 1 is a schematic illustration of a windscreen and a device positioned in a passenger compartment of a motor vehicle (not shown).

The invention and its advantages will be made more evident by a reading of the following description of an embodiment of the invention, with reference to the attached FIG. 1.

The windscreen 1 is composed of two sheets 2 and 9, which are typically made of glass but which could equally well be made of sheets of strong plastic material of the polycarbonate type. Between the two sheets there is a plastic interlayer 3 such as PVB (polyvinyl butyral), plasticized PVC, PU or EVA, or a multilayer thermoplastic sheet incorporating, for example, PET (polyethylene terephthalate), in which the sequence of layers is, for example, PVB/PET/PVB.

Particles of organic fluorescent material of the terephthalate type according to the invention are deposited on at least one part of the inner surface of the thermoplastic interlayer 3 before the lamination, in other words before the assembly of the various sheets.

The particles of fluorescent material have a size distribution mainly in the range from 1 to 100 microns. The term "mainly" signifies that more than 90% of the particles forming the commercial powder have a diameter in the range from 1 to 100 microns. Preferably, the particles of terephthalate fluorescent material are subjected to preliminary treatment to promote their impregnation into the thermoplastic PVB sheet. More specifically, the particles are incorporated in a PVB-based binder in advance.

A laser source 4 emitting an exciting light radiation is used to send an incident concentrated radiation 7 with a wavelength of 405 nm towards a portion 10 of the windscreen on which the real image is to be generated. At least this portion of the glazing comprises a suitable fluorescent material. The fluorescent material is advantageously of the hydroxy-terephthalate type as described in the application WO2010/139889, and is, for example, solvated in molecular form in the thermoplastic interlayer 3. The fluorescent material has a high absorption coefficient for incident radiation. It subsequently re-emits radiation in the visible region, in other words radiation close to 450 nm, with an efficiency of more than 80%. Advantageously, the laser projector further comprises a polarizer for polarizing the incident beam, particularly in such a way that its electromagnetic field is transverse magnetic.

For the purpose of the present invention, the term "transverse magnetic" signifies a TM/TE polarization ratio of at least 100:10, or preferably at least 100:1.

The visible radiation emitted by the fluorescent material is then directly observable by the driver's eye 5, which thus views the object on the windscreen without having to look away from the road. In this way, an image can be directly formed on a laminated windscreen without any need to adapt the structure of the windscreen, in respect of the thickness of the interlayer for example. This enables HUD systems to be manufactured economically.

According to the invention, the source used to generate the concentrated radiation is a UV laser source. The possible sources include, but are not limited to, solid lasers, semiconductor diode lasers, gas lasers, dye lasers and excimer lasers. As a general rule, any known source generating a UV radiation flux which for the purposes of the present invention is directed and concentrated can be used as an excitation source according to the invention. Alternatively, it is possible to use incoherent light sources such as light-emitting diodes, preferably of the power type and operating in the near UV region.

In one possible embodiment, a DLP projector can be used to modulate the exciting radiation by the method described in the application US 2005/231652, paragraph [0021]. It is also possible, according to the invention, to use as the UV excitation source a device as described in the application US2004/0232826, notably one of the type described in relation to FIG. 3.

These systems can be used to illuminate specific portions of the glazing with the laser radiation, in order to display any information useful to the driver while he is driving, notably for the purpose of ensuring his safety, or for navigation.

Clearly, the preceding embodiment does not limit the present invention in any way regarding the aspects described above.

According to the invention, the area in question can be illuminated by a device operating by rapid scanning of said area by the source or by the simultaneous activation of pixels in said area by means of a plurality of mirrors controlled by said source.

In particular, in a first embodiment, a projector based on a MEMS micro-mirror with a laser source can be used. In another embodiment, projectors based on DLP, LCD or LCoS matrices with a laser or LED source are used. Alternatively, it is possible, according to the invention, to use a projector based on galvanometer-mounted mirrors reflecting a laser source.

In the passenger compartment of a vehicle of this kind, the main safety problem during the operation of the device is posed by the reflected part of the radiation on the surface of the windscreen, which may be, in a first approximation, relatively high and directed towards the passengers' eyes, if allowance is made, notably, for the inclination and curvature of the laminated windscreen in the area illuminated by the incident beam.

According to the invention, the source, such as a UV laser source, is positioned in the passenger compartment by the method according to the present invention, so as to minimize the reflection of the incident radiation from the inner wall of the windscreen towards the passenger compartment.

By way of example, in the case of a passenger compartment of a motor vehicle, the projector can be located in numerous positions, including, but not limited to, the most common positions which are on the dashboard, on the ceiling of the vehicle or on the windscreen uprights. For a given passenger compartment, and depending on the portion of the windscreen onto which the image is to be projected, it is thus possible to identify the set of positions where the projector can be installed.

The following examples, based on the modelling of the embodiment described above, demonstrate the advantages obtained by the use of the present method for the positioning of the laser projector with the purpose of minimizing the previously described risks for the passengers in the vehicle, by substantially reducing the degree to which the beam emerging from the source is reflected on the surface of the windscreen.

EXAMPLES

The present examples relate, once again, to the embodiment described previously with reference to FIG. 1, in which the laminated windscreen 1 comprising the fluorescent material is illuminated by the source or projector 4 of the laser radiation which illuminates a portion 10 of the glazing.

Figure 2:
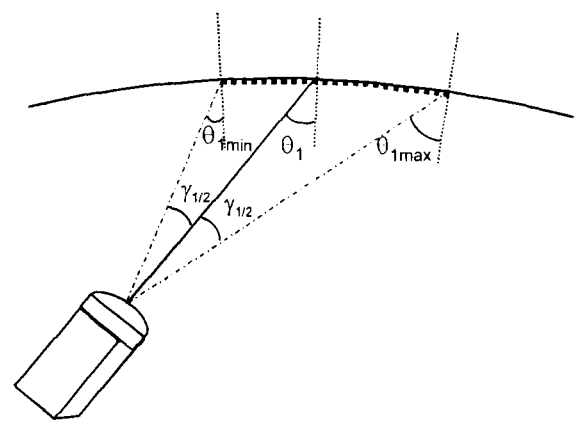
FIG. 2 shows various possible configurations of the positioning of the projector in a single vertical plane of the windscreen.

The attached FIG. 2 shows various possible configurations of the positioning of the projector in a single vertical plane of the windscreen, for the sake of simplicity (projection 1D). Clearly, in a real case, the illuminated area would also comprise a horizontal component which is not shown here.

It is assumed that the projector used is a visible UV laser with a radiation of 405 nm which is constructed in such a way that it has an angular half/width $\gamma_{1/2}$ of 10°.

The term "angular half-width" signifies, for the purposes of the present invention, the angle between the most divergent rays which can be emitted by the projector and the optical axis of the projector.

For a first position, the device is placed in a position 1 (FIG. 2), in order to illuminate the area 10 on the windscreen 1. As shown in FIG. 2, and for the purposes of the present description, the angle of incidence $\theta_1$ is defined as the angle between the beam, when this is emitted in the central position of the laser device (in other words along the optical axis of the projector), and the perpendicular to the windscreen at the point of incidence on the glazing, with allowance for the curvature and inclination of the latter.

For each point illuminated in this way, between the intervals $\theta_{1min}$ and $\theta_{1max}$, corresponding to the limit angular widths of the device (in other words, $-\gamma_{1/2}$ and $+\gamma_{1/2}$ respectively about the central position of the beam), the percentage R of reflection of the incident radiation is determined, using conventional modelling methods for example.

Finally, a value $\theta_{1(Rmax)}$ and an associated value $R_{1max}$, corresponding to a maximum value of the reflection of the radiation, are determined, for conditions in which:
- the incident radiation is non-polarized (NP),
- the incident radiation is transverse electric polarized (TE),
- the incident radiation is transverse magnetic polarized (TM).

The projector is then moved to another position $i_2$ such that the same area 10 can be illuminated by the projector. In this configuration, the beam strikes the windscreen with another angle of incidence equal to $\theta_2$.

As in the preceding configuration, for each point scanned in this way between the intervals $\theta_{2min}$ and $\theta_{2max}$, the percentage R of reflection of the incident radiation is determined, together with a value $\theta_{2(Rmax)}$ and an associated value $R_{2max}$ as a function of the polarization of the incident radiation.

The principal results obtained for different calculated positions are shown in Table 1 below.

TABLE 1

| Angle $\theta_i$ | Polarization | Maximum reflection ($R_{imax}$) in the range $\pm \gamma_{1/2}$ |
|---|---|---|
| 0° | TM | 4.54% |
| 0° | TE | 4.73% |
| 0° | NP | 4.55% |
| 20° | TM | 4.36% |
| 20° | TE | 6.50% |
| 20° | NP | 4.70% |
| 55° | TM | 1.16% |
| 55° | TE | 24.4% |
| 55° | NP | 12.8% |
| 60° | TM | 4.04% |

The data in Table 1 show that the reflection rate can be limited when the radiation is transverse magnetic polarized (TM) and when the angle of incidence $\theta$ of the beam on the windscreen is about 50°, with allowance for the curvature and inclination of the windscreen and the angular width of the source. In a second set of experiments, the source was modified in such a way that its angular half-width $\gamma_{1/2}$ was equal to 20°.

Proceeding in the same manner as before, the present method was used to determine the optimal angle at which the reflection of the incident radiation from the windscreen was minimal. The results obtained and a comparison with the previous example are shown in Table 2 below:

TABLE 2

| Polarization | Optimal angle $\theta$ | $\gamma_{1/2}$ | Maximum reflection $R_{max}$ in the range $\theta \pm \gamma_{1/2}$ |
|---|---|---|---|
| TM | 55° | 10° | 1.16% |
| Non-polarized | 0° | 10° | 4.55% |
| TM | 48° | 20° | 3.12% |
| Non-polarized | 0° | 20° | 4.57% |

The combined analysis of the results given in Tables 1 and 2 shows that an optimal positioning of the source can be found by the use of the present method, with allowance for the nature of the passenger compartment and the shape and positioning of the windscreen, on the basis of the principles and parameters set out above.

The invention claimed is:

1. A method for displaying a real image on a glazing fitted in a passenger compartment, wherein the displaying occurs with a device comprising a source emitting a beam of radiation of visible UV or IR laser or from a light-emitting diode, directed towards a portion of the glazing comprising a fluorescent material absorbing the radiation and re-emitting light in the visible region, the illumination of the portion by the beam enabling the image to be displayed on the glazing, wherein the method comprises:
    (a) identifying a set of positions $i_{[1;n]}$ in the passenger compartment from which the source can illuminate substantially the same portion of the glazing:
    (b) from a first position $i_1$ of the source in the passenger compartment, emitting a polarized incident beam in such a way that its electromagnetic field is transverse magnetic;
    (c) for a whole portion of the glazing illuminated by the beam, measuring variations of an angle of incidence $\theta_1$, and determining a value of an angle $\theta_{1(Rmax)}$ for which a reflection $R_{1\ max}$ of incident radiation by the glazing is maximal in the illuminated area and for the first position $i_1$ of the source;
    (d), performing steps (d1) and (d2) so as to determine a value $\theta_{2(Rmax)}$ for which a reflection $R_{2max}$ of the incident radiation by the glazing is maximal in said illuminated area and for the source location $i_2$ wherein step (d1) is a step emitting a polarized incident beam in such a way that its electromagnetic field is transverse magnetic from a second position $i_2$ of the source in the passenger compartment, and step(d2) is a step of, for a whole portion of the glazing illuminated by the beam, measuring variations of an angle of incidence $\theta_2$ and determinin a value of an angle $\theta_{2(Rmax)}$ for which a reflection $R_{2max}$ of incident radiation by the glazing is maximal in the illuminated area and for the second position $i_2$ of the source;
    (e) performing steps (e1) and (e2) for all source positions $i_n$ wherein step (e1) is a step of emitting a polarized incident beam in such a way that its electromagnetic field is transverse magnetic from a n-th position $i_n$ of the source in the passenger compartment, and wherein step (e2) is a step of, for a whole portion of the glazing illuminated by the beam, measuring variations of an angle of incidence $\theta_n$, and determining a value of an angle $\theta_{n(Rmax)}$ for which a reflection $R_{nmax}$ of incident radiation by the glazing is maximal in the illuminated area and for the n-th position $i_n$ of the source: and
    (f) locating the source in a position i for which a value $R_{imax}$ is minimal.

2. The method of claim 1, wherein the source generates a visible UV laser radiation in a range from 380 to 410 nm.

3. The method of claim 1, wherein the source is a device generating UV laser radiation over an angular half-width $\gamma_{1/2}$ in the range from 5° to 25° serving to illuminate the portion of the glazing.

4. The method of claim l, wherein the device is selected from the group consisting of
    a projector having a MEMS micro-minor with a laser source, a projector having DLP, LCD or LCoS matrices with a laser or LED source, and a projector having galvanometer-mounted mirrors reflecting a laser source.

5. The method of claim 1, wherein the glazing is a laminated glazing comprising an assembly of at least two transparent sheets of inorganic glass or strong organic material, joined together by an interlayer of a thermoformable material or by multilayer sheets incorporating the interlayer, said glazing having a fluorescent material integrated into the interlayer, and permitting display.

6. The method of claim 5, wherein the thermoforinable material forming the interlayer is selected from the group consisting of a PVB, a plasticized PVC, a polyurethane and an ethylene vinyl acetate.

7. The method of claim 5, wherein the fluorescent arterial is a hydroxyakyl terephthalate R—OOC-Φ(OH)$_x$—COOR, having the structural formula:

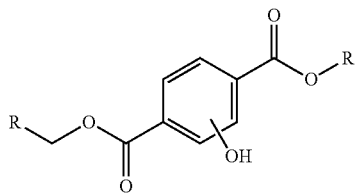

wherein:
Φ represents a benzene ring substituted by at least one hydroxy group (OH),
R is a hydrocarbonated chain comprising 1 to 10 atoms, and
x is equal to 1 or 2.

8. The method of claim 7, wherein the fluorescent material is diethyl-2,5-dihydroxy terephthalate.

9. A passenger compartment, comprising a device for displaying a real image on a glazing, said device comprising a source emitting a beam of a concentrated directional radiation of laser directed towards a portion of the glazing comprising a fluorescent material absorbing the radiation and re-emitting light in the visible region, the illumination of the portion by the beam permitting the display of a real image on the glazing, wherein the source is positioned in the passenger compartment by the method of claim 1.

10. The method of claim 1, wherein the glazing is a laminated glazing.

11. The method of claim 1, wherein the source generates a visible UV laser radiation in at 405 nm.

12. The method of claim 1, wherein the source is a device generating UV laser radiation over an angular half-width $\gamma_{1/2}$ in the range from 10° to 20° serving to illuminate the portion of the glazing.

* * * * *